(12) United States Patent
Horikoshi

(10) Patent No.: US 8,593,575 B2
(45) Date of Patent: Nov. 26, 2013

(54) VIDEO DISPLAY APPARATUS FOR SHORTENED-DELAY PROCESSING OF A VIDEO SIGNAL AND VIDEO PROCESSING METHOD

(75) Inventor: Kenichi Horikoshi, Kumagaya (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/308,382

(22) Filed: Nov. 30, 2011

(65) Prior Publication Data

US 2012/0224105 A1    Sep. 6, 2012

(30) Foreign Application Priority Data

Mar. 1, 2011  (JP) .................................. 2011-044372

(51) Int. Cl.
*H04N 9/64*  (2006.01)
*H04N 3/27*  (2006.01)
*H04N 5/268*  (2006.01)
*H04N 5/14*  (2006.01)

(52) U.S. Cl.
USPC ............................ 348/571; 348/706; 348/554

(58) Field of Classification Search
USPC ......... 348/553–558, 705, 706, 552, 571, 511, 348/512, 569, 714, 716; 725/133, 141, 153; 463/30, 40–43, 31; 345/473–475, 156
See application file for complete search history.

(56) References Cited

U.S. PATENT DOCUMENTS

| | | | | |
|---|---|---|---|---|
| 5,473,595 A | * | 12/1995 | Hayashi et al. .......... | 369/124.09 |
| 5,574,507 A | * | 11/1996 | Baek .............................. | 348/511 |
| 5,608,424 A | * | 3/1997 | Takahashi et al. ............ | 345/467 |
| 6,636,214 B1 | * | 10/2003 | Leather et al. ................ | 345/422 |
| 6,672,963 B1 | * | 1/2004 | Link ................................ | 463/43 |
| 6,816,975 B1 | * | 11/2004 | Sasaki et al. ................... | 713/300 |
| 7,586,546 B2 | * | 9/2009 | Lee et al. ........................ | 348/625 |
| 7,729,421 B2 | * | 6/2010 | Campisano et al. ...... | 375/240.01 |
| 7,907,216 B2 | | 3/2011 | Choi | |
| 2001/0045941 A1 | * | 11/2001 | Rosenberg et al. ........... | 345/161 |
| 2005/0266924 A1 | | 12/2005 | Horikoshi | |
| 2006/0132657 A1 | | 6/2006 | Lee et al. | |
| 2006/0268175 A1 | | 11/2006 | Choi | |
| 2008/0117329 A1 | * | 5/2008 | Wyman .......................... | 348/448 |
| 2010/0277641 A1 | * | 11/2010 | Kato et al. ..................... | 348/441 |

FOREIGN PATENT DOCUMENTS

| | | |
|---|---|---|
| JP | S 63156487 | 6/1988 |
| JP | H 11136643 | 5/1999 |
| JP | 2000-341583 | 12/2000 |

(Continued)

OTHER PUBLICATIONS

Japanese Patent Application No. 2011-044372, Notice of Reasons for Refusal, mailed Mar. 22, 2012, (with English Translation).

*Primary Examiner* — Victor Kostak
(74) *Attorney, Agent, or Firm* — Blakely, Sokoloff, Taylor & Zafman LLP

(57) ABSTRACT

According to one embodiment, a video display apparatus includes a video processing module and a controller. The video processing module is configured to perform signal processing on a video signal to generate a display video signal, and to output the display video signal to a display module. The controller is configured to turn on or off short delay processing mode, and to control the video processing module so that a delay time of the display video signal from the video signal becomes approximately 12 to 17 ms at a minimum when the short delay processing mode is on.

10 Claims, 11 Drawing Sheets

(56) References Cited

FOREIGN PATENT DOCUMENTS

| | | |
|---|---|---|
| JP | 2005-338605 | 12/2005 |
| JP | 2005338605 | 12/2005 |
| JP | 2006178425 | 7/2006 |
| JP | 2006330730 | 12/2006 |
| JP | 2006352303 | 12/2006 |
| JP | 2009-021868 | 1/2009 |
| JP | 2009021868 | 1/2009 |
| JP | 2009-027371 | 2/2009 |
| JP | 2009027371 | 2/2009 |

* cited by examiner

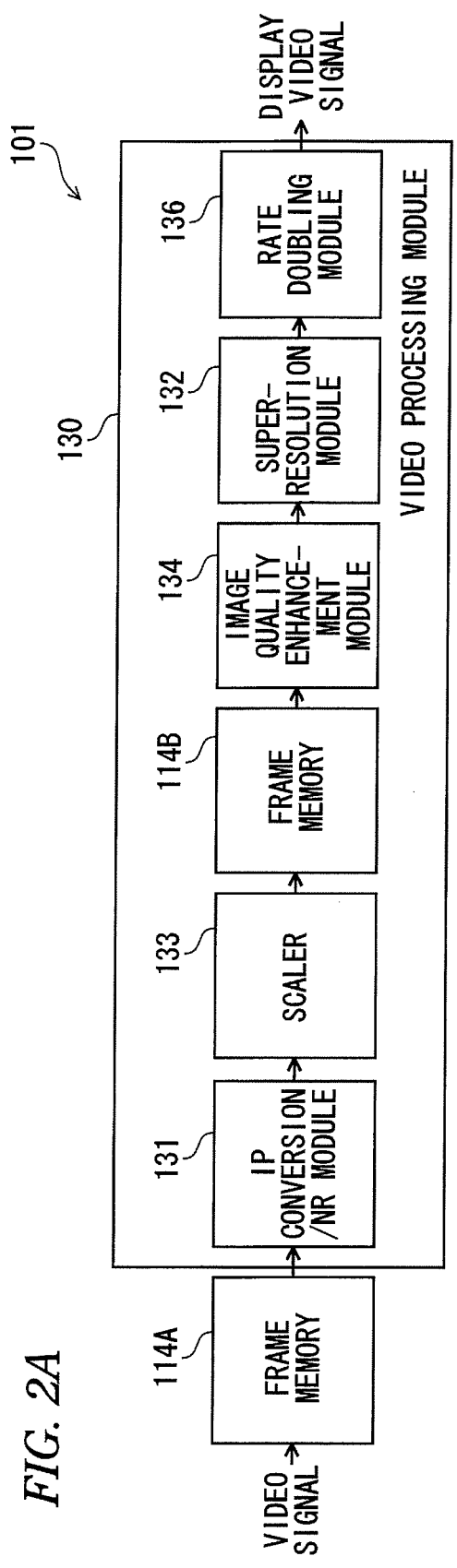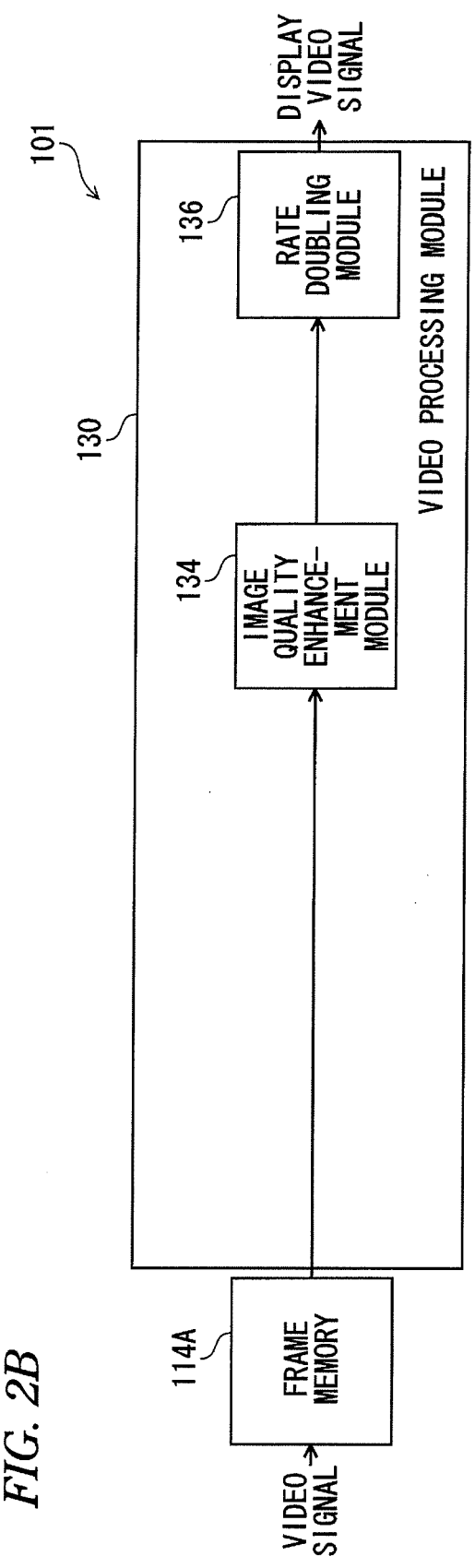

*FIG. 4A*  *FIG. 4B*
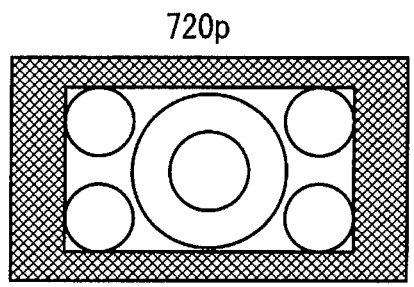
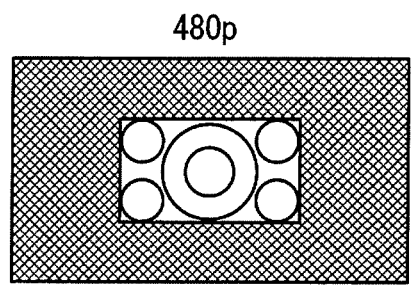

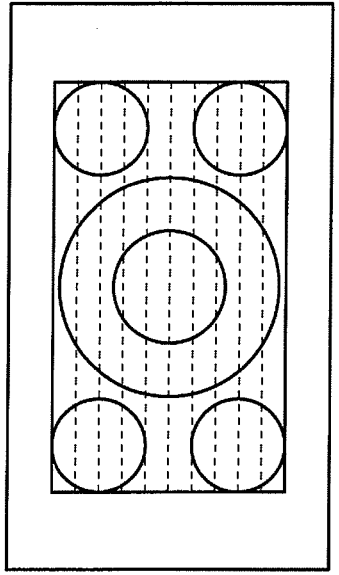
FIG. 9B
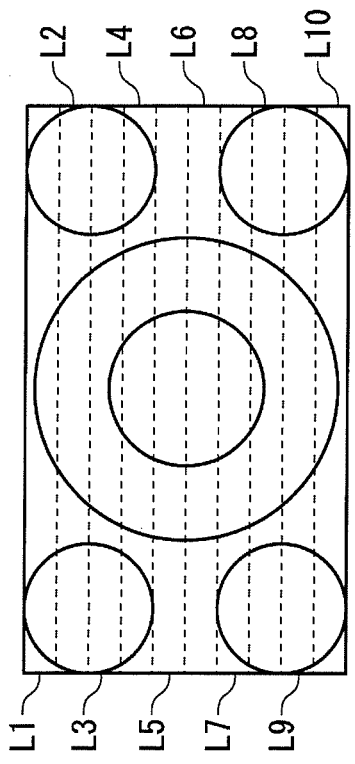
FIG. 9A
FIG. 9C
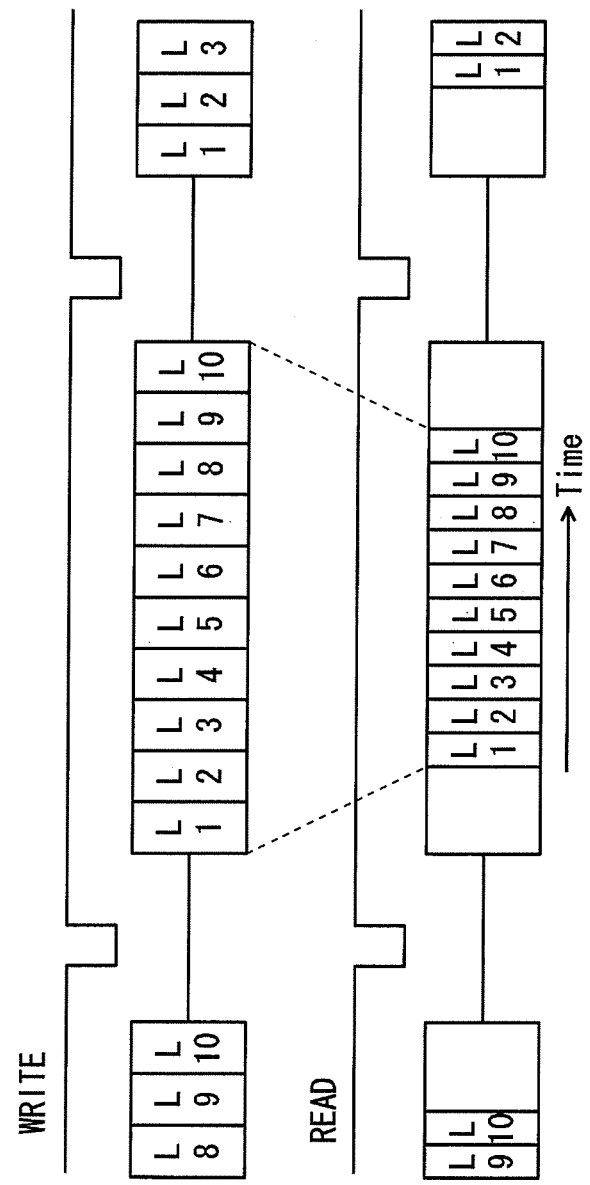

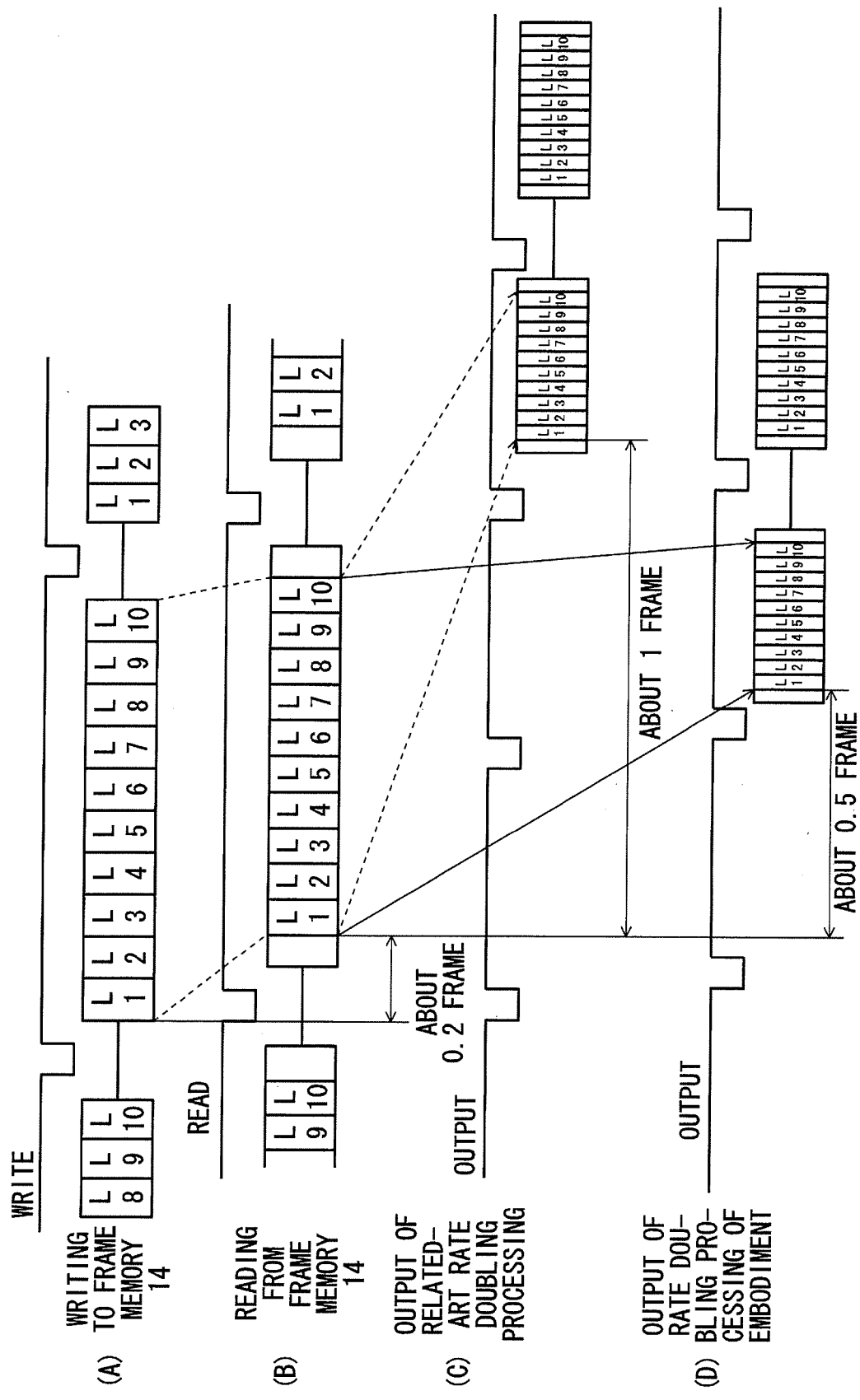

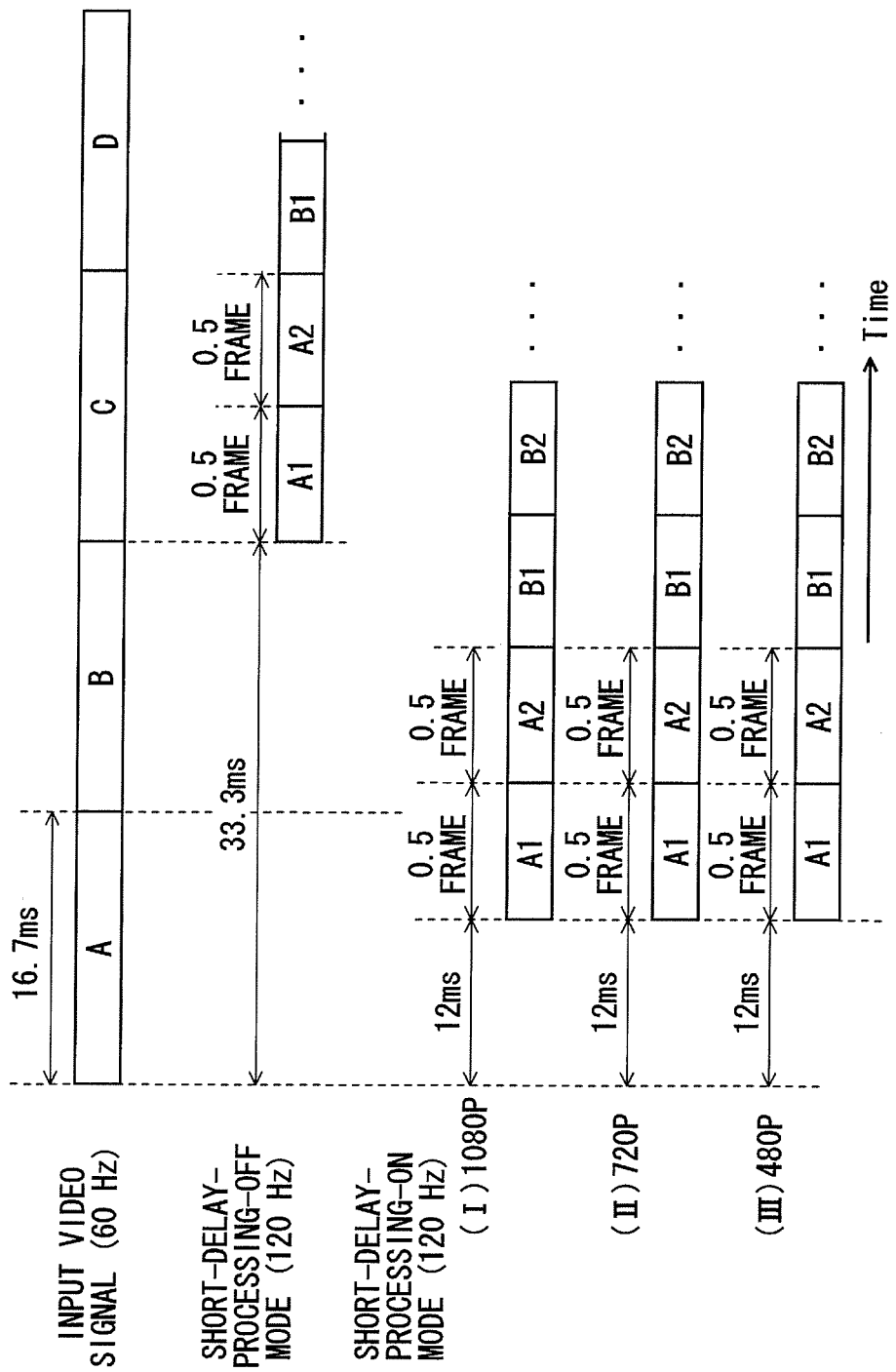

VIDEO DISPLAY APPARATUS FOR SHORTENED-DELAY PROCESSING OF A VIDEO SIGNAL AND VIDEO PROCESSING METHOD

CROSS REFERENCE TO RELATED APPLICATION(S)

This application is based upon and claims the benefit of priority from Japanese Patent Application No. 2011-044372 filed on Mar. 1, 2011, the entire contents of which are incorporated herein by reference.

FIELD

Embodiments described herein relate to a video display apparatus and a video processing method.

BACKGROUND

TV receivers have spread which allow the user to enjoy a game when a game machine is connected to them. The user causes a game machine to operate by connecting it to an external input terminal of a TV receiver, whereby video and audio generated by the game machine are output from the display module and the speakers of the TV receiver. That is, the user can enjoy a game with display on a large screen by using the TV receiver as an external output device of the game machine.

In recent TV receivers, various kinds of video signal processing are performed to improve the image quality. Video signal processing requires a time because frame information is necessary and processing needs to be performed on a frame-by-frame basis. A short delay that is shorter than 50 ms, for example, does not cause any problem in viewing of ordinary broadcast programs etc. However, if a video signal that is output from a game machine is displayed with some delay, an operation that the user makes in response to a display corresponding to the video signal is also delayed, which may cause problems that, for example, the user feels uncomfortable or the result of a game is changed. For example, in a shooting game in which the user aims at and shoots a target that is moving across a display screen at high speed, even only a short delay results in loss of a shooting chance.

A display apparatus which solves the above problems is known. This display apparatus can shorten the delay time by omitting digital calculation processing to be performed on an input video signal when it is used for a game, for example.

BRIEF DESCRIPTION OF THE SEVERAL VIEWS OF THE DRAWINGS

A general configuration that implements the various features of the invention will be described with reference to the drawings. The drawings and the associated descriptions are provided to illustrate embodiments of the invention and not to limit the scope of the invention.

FIG. 2A is an exemplary block diagram explaining a video signal processing of the TV receiver when a short delay processing mode is off;

FIG. 2B is an exemplary block diagram showing the video signal processing of the TV receiver when the short delay processing mode is on;

FIG. 4A is an exemplary view explaining display state of a video signal of 720p displayed on a display panel of 1,080p;

FIG. 4B is an exemplary view explaining display state of a video signal of 480p displayed on a display panel of 1,080p;

FIG. 9A is an exemplary view explaining a passing phenomenon and showing a write image;

FIG. 9B is an exemplary view explaining the passing phenomenon and showing a read image;

FIG. 9C is an exemplary view explaining the passing phenomenon and showing a time chart of write/read;

FIGS. 10A-10D are an exemplary timing chart of a signal processing according to the embodiment; and FIG. 11 is an exemplary time chart explaining the delay time of the TV receiver according to the embodiment.

DETAILED DESCRIPTION

In general, according to one embodiment, a video display apparatus includes a video processing module and a controller. The video processing module is configured to perform signal processing on a video signal to generate a display video signal, and to output the display video signal to a display module. The controller is configured to turn on or off short delay processing mode, and to control the video processing module so that a delay time of the display video signal from the video signal becomes approximately 12 to 17 ms at a minimum when the short delay processing mode is on.

Figure 1:
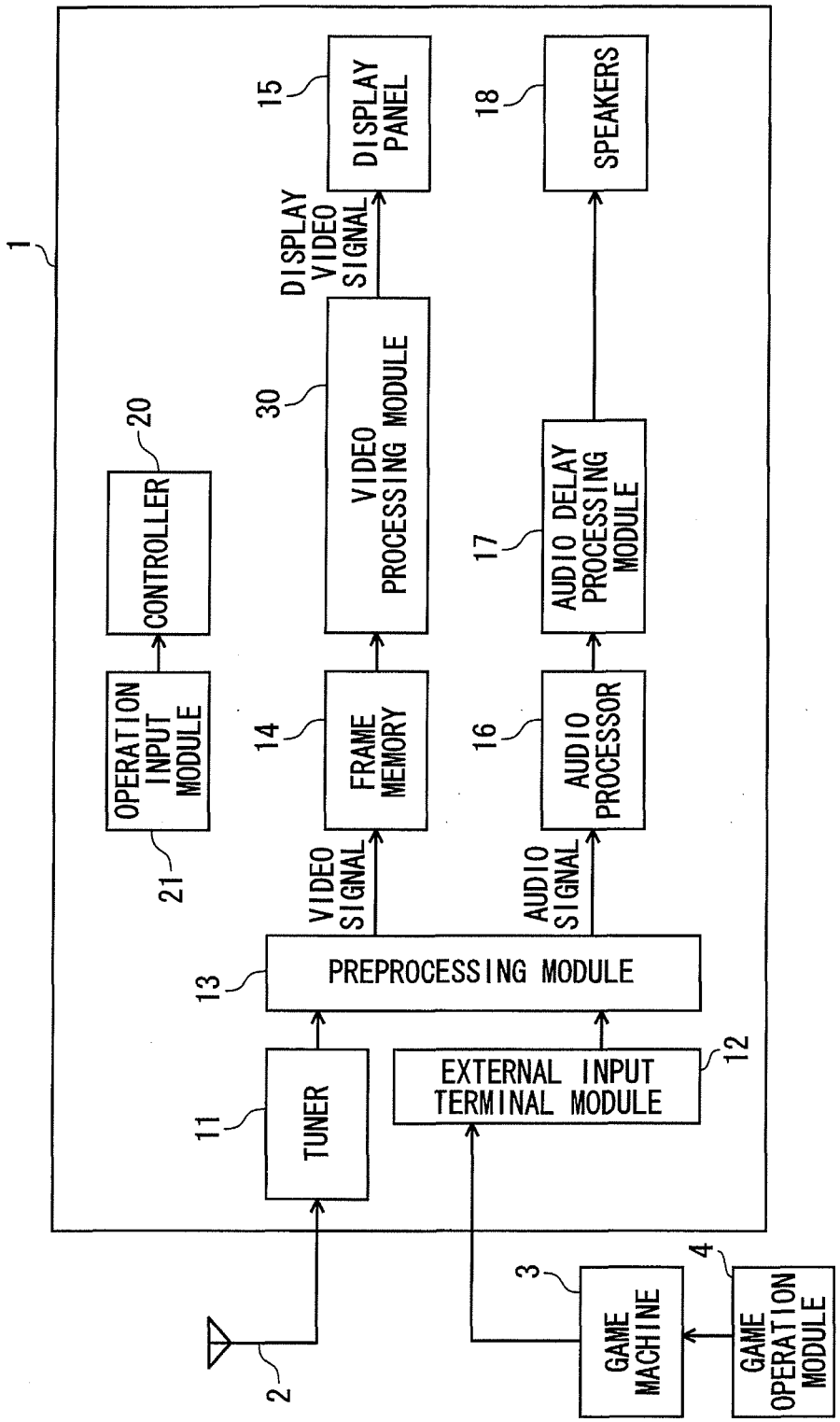
FIG. 1 is an exemplary block diagram showing a TV receiver according to an embodiment.

An exemplary embodiment will be hereinafter described in detail with reference to the drawings. FIG. 1 is a block diagram of a video display apparatus according to the embodiment.

As shown in FIG. 1, a TV receiver 1 (video display apparatus) is equipped with a tuner 11, an external input terminal module 12, a preprocessing module 13, a frame memory 14, a video processing module 30, an operation input module 21, a controller 20, an audio processor 16, and an audio delay processing module 17. Although the frame memory 14 and the video processing module 30 are drawn separately for convenience of description, the frame memory 14 can be regarded as part of the video processing module 30 and the frame memory 14, the video processing module 30, etc. may be implemented as a single system LSI.

An antenna 2 is connected to the tuner 11, and a game machine 3 having a game operation module 4 is connected the external input terminal module 12. In the TV receiver 1, video is output from a display panel 15 as a display module and audio is output from speakers 18 as audio output modules.

The tuner 11 tunes in to a broadcast signal of a satellite broadcast such as a BS broadcast or a CS broadcast, a terrestrial broadcast, or the like, processes the selected broadcast signal, and outputs a video signal and an audio signal. The tuner 11 can also receive a signal that is transmitted by a communication line such as a cable TV line.

The external input terminal module 12 receives, from an external apparatus such as the game machine 3 or a hard disk recorder, as external input signals, a video signal and an audio signal that are in one of various signal formats such as a composite signal, an S-terminal signal, a color difference signal, and a D-sub signal.

The preprocessing module 13 receives multiple sets of a video signal and an audio signal from the tuner 11 and the external input terminal module 12, selects one set of a video signal and an audio signal, performs preprocessing on it, and outputs a resulting video signal and audio signal to the frame memory 14 and the audio processor 16, respectively.

The video signal is supplied to the video processing module 30 (described later in detail) via the frame memory 14 and subjected to signal processing there. A resulting display video signal is output to the display panel 15. The audio signal is subjected to signal processing in the audio processor 16 and a resulting signal is supplied to the audio delay processing module 17, where it is subjected to delay processing according to a delay time of the video signal. A resulting signal is output to the speakers 18.

The operation input module 21 generates an operation signal on the basis of a user operation and supplies it to the controller 20. The controller 20 is a CPU which controls the entire TV receiver 1 according to the operation signal that is supplied from the operation input module 21. The controller 20 is configured so as to be able to switch between two operation modes of the video processing module 30, that is, an operation mode in which short delay processing for shortening the delay time of a display video signal from an input video signal is on and an operation mode in which the short delay processing is off (i.e., causes the video processing module 30 to perform ordinary processing).

The controller 20 can on/off-control the short delay processing mode according to the video mode. The TV receiver can operate in various video modes such as a leaving-up mode, a clear mode, a standard mode, a TV professional mode, a movie professional mode, a game mode, and a PC mode. For example, the controller 20 turns on the short delay processing mode when the game mode or the PC mode is selected, and turns off the short delay processing mode (i.e., causes the video processing module 30 to perform ordinary processing) when the leaving-up mode, the clear mode, the standard mode, the TV professional mode, or the movie professional mode is selected. The TV receiver 1 may be configured so that the operation input module 21 directly gives an instruction to turn on or off the short delay processing mode. In this case, the controller 20 turns on or off the short delay processing mode according to an operation signal that is supplied from the operation input module 21.

When the short delay processing mode is on (short-delay-processing-on mode), the controller 20 controls the video processing module 30 to perform the signal processing so as to shorten the delay time of the display video signal from the input video signal.

Now, for comparison with the TV receiver 1, a description will be made of another TV receiver 101 which shortens the delay time by a different method than the TV receiver 1. The TV receiver 101 is equipped with a frame memory 114A and a video processing module 130 in place of the frame memory 14 and the video processing module 30, respectively. In the TV receiver 101, when the short delay processing mode for shortening the delay time is selected, the controller 20 controls the video processing module 130 to omit part of the signal processing.

More specifically, in the TV receiver 101, when the short delay processing mode is off (short-delay-processing-off mode), the controller 20 controls the video processing module 130 to perform all of pieces of signal processing shown in FIG. 2A. When the short delay processing mode is on (short-delay-processing-on mode), as shown in FIG. 2B, the controller 20 controls the video processing module 130 to perform only image quality enhancement process by an image quality enhancement module 134.

The video processing module 130 of the TV receiver 101 is provided with an IP (interlace/progressive) conversion/NR (noise reduction) module 131, a scaler 133, a frame memory 114B, the image quality enhancement module 134, a super-resolution module 132, and a rate doubling module 136.

The IP conversion/NR module 131 performs IP conversion processing for converting an interlaced video signal into a progressive video signal and noise reduction processing for reducing roughness, flicking, blocking noise, and mosquito noise of video. As such, the IP conversion/NR module 131 is composed of an IP conversion module and an NR module. A progressive input video signal is not subjected to the IP conversion processing. The noise reduction processing may be omitted in the case where the input video signal contains only small noise. That is, the IP conversion/NR module 131 performs at least one of the IP conversion processing and the noise reduction processing.

The scaler 133 performs scaling processing on a video signal that does not conform to the specifications of the display panel 15 to make it conform to the specifications of the display panel 15. For example, where an input video signal has an aspect ratio 4:3 and the display panel 15 has an aspect ratio 16:9, the scaler 133 converts the input video signal into a video signal having an aspect ratio 16:9.

Like the upstream frame memory 114A, the frame memory 114B stores a video signal in units of a frame to serve for image quality enhancement processing. Storage areas of a single memory may be used as the frame memories 114A and 114B as long as each of the storage areas can store at least a one-frame video signal.

To improve the image quality of video, the image quality enhancement module 134 performs pieces of image quality enhancement processing such as color correction (gamma connection, white balance adjustment, brightness adjustment, and contrast adjustment), sharpness adjustment, edge enhancement, and response speed increasing.

The super-resolution module 132, which is a resolution enhancement module, generates video that is higher in resolution than original video by generating new pixel value data at positions between pixels and thereby creating high frequency components and sharpening the video. That is, the super-resolution module 132 restores a video signal having a high resolution (second resolution) by estimating pixel values to exist on the basis of a video signal having a low resolution (first resolution) and thereby increasing the number of pixels. For example, the term "pixel values to exist" means pixel values of a video signal that would be produced when the same subject as the video signal having the low resolution (first resolution) has been produced were shot with a camera having the high resolution (second resolution). The phrase "to estimate pixel values and thereby increase the number of pixels" means estimating pixel values to exist using a high-correlation image of the same frame or another frame by recognizing features of the video concerned and employing them as pixel vales of new pixels (i.e., correlation between images is utilized). The super-resolution module 132 utilizes a known technique such as a technique for restoring video having frequency components that are higher than a Nyquist frequency that is determined by the sampling period of input video.

The rate doubling module 136 performs rate doubling processing of doubling the frame frequency, that is, increasing the frame frequency to 100 Hz or 120 Hz in the case where input frame frequency is 50 Hz or 60 Hz, and thereby lowering the degree of afterimage. The rate doubling processing may employ a method in which an interpolation frame to be inserted between two consecutive frames is generated by motion compensation prediction or what is called a simple double repeat method in which the same image is simply displayed twice.

Next, delay times caused by the pieces of signal processing performed by the above-described respective modules will be described. Each of the frame memories 114A and 114B outputs a video signal after storing it in units of a frame and hence is a source of a delay time of one frame. The rate doubling module 136 is also a source of a delay time of one frame. The following description will be made with an assumption that the frame frequency is 60 Hz, in which case one frame corresponds to about 16.7 ms.

Figure 3:
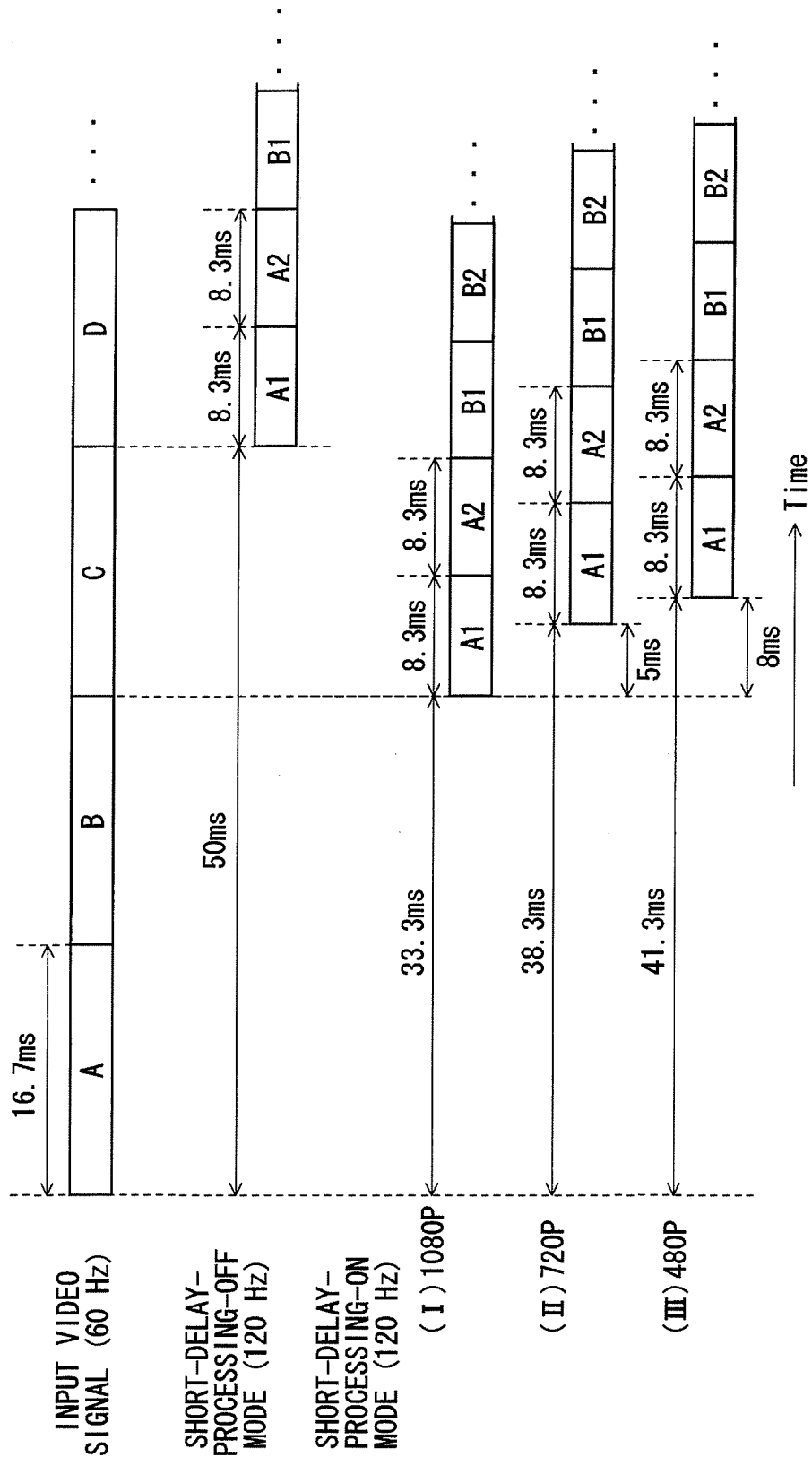
FIG. 3 is an exemplary time chart showing a delay time of TV receiver 101.

Therefore, as shown in FIG. 3, in the TV receiver 101, a delay time of about 50 ms, for example, occurs in the short-delay-processing-off mode. On the other hand, in the short-delay-processing-on mode, the delay time can be shortened to 33.3 ms which corresponds to two frames.

However, as shown in FIGS. 4A and 4B, where the input video signal is of 720p or 480p that is smaller than 1,080p of the display panel 15, periods of top and bottom non-signal regions (black regions) on the screen occur and hence the delay time is elongated to 38.3 ms or 41.3 ms. In the short-delay-processing-off mode, since scaling processing is performed, even if the input video signal is of 720p or 480p, the delay time remains the same as in the case where the input video signal is of 1,080p.

That is, in the TV receiver 101, since the image quality enhancement module 134 can process only a video signal that is read from a frame memory, even in the short-delay-processing-on mode the image quality enhancement module 134 needs to take in a video signal from a frame memory immediately before performing image quality enhancement processing. If the TV receiver 1 were configured in such a manner that in this case the image quality enhancement module 134 reads a video signal from the frame memory 114B, the video signal would be stored in the two frame memories 114A and 114B and hence the delay time shortening effect would be reduced accordingly. In view of this, as shown in FIG. 2B, in the TV receiver 101, the short delay processing mode with a minimum delay time is realized by the image quality enhancement module 134's reading a video signal from the frame memory 114A. However, in the TV receiver 101 having such a configuration, in the short-delay-processing-on mode, neither the IP conversion/NR processing nor the scaling process can be performed and hence an interlaced signal of 480i, 1,080i, or the like cannot be processed. On the other hand, the delay time can be shortened in the case where a progressive signal is subjected to non-scaling (dot-by-dot) processing. In other words, in the TV receiver 101, the delay time can be shortened in the short-delay-processing-on mode under prescribed restrictions.

Figure 5:
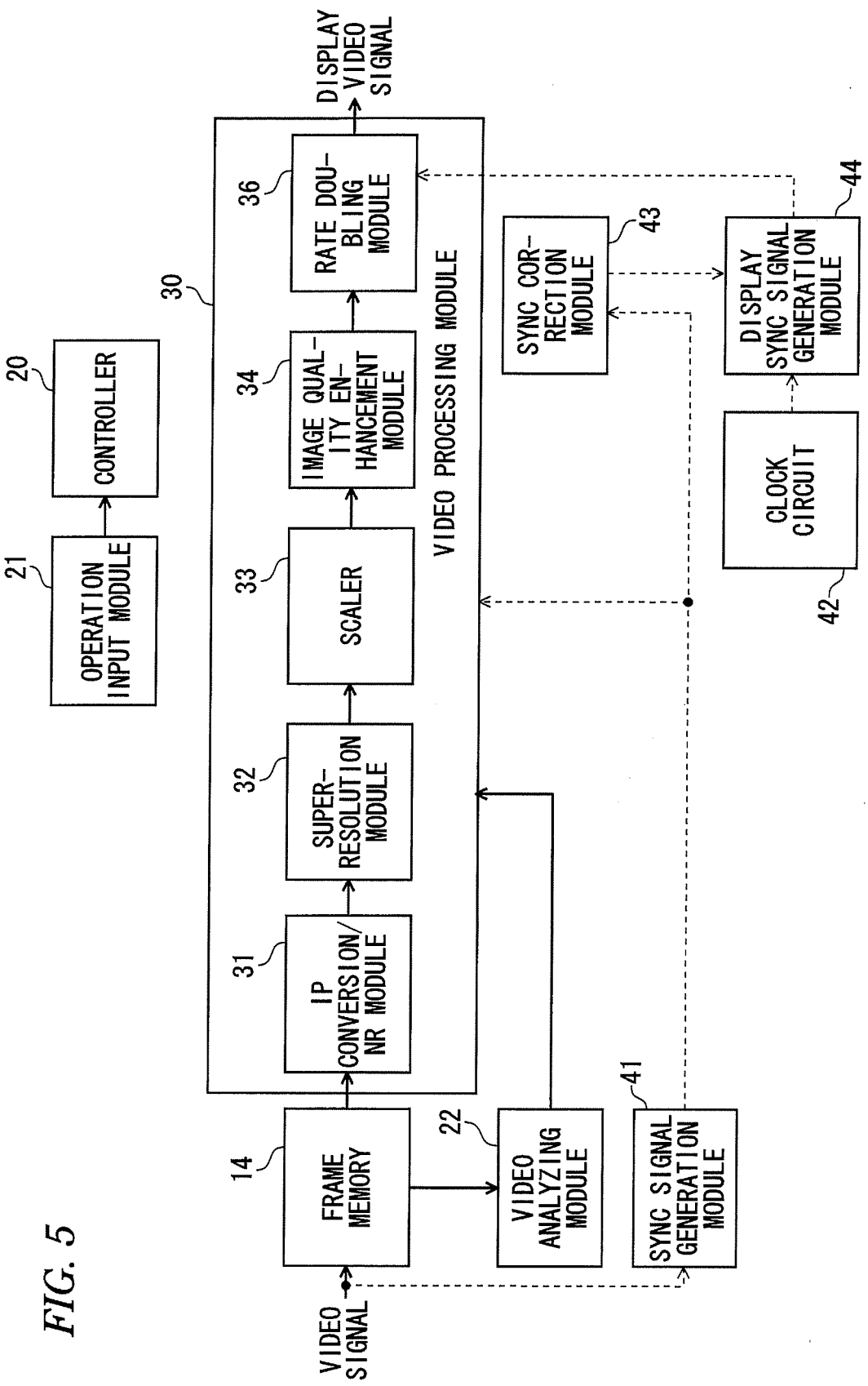
FIG. 5 is an exemplary block diagram explaining a signal processing of the TV receiver according to the embodiment.

The TV receiver 1 according to the embodiment is equipped with processing modules that are similar to the processing modules of the TV receiver 101 shown in FIGS. 2A and 2B. FIG. 5 is a block diagram which is a detailed version of FIG. 1 and, in particular, shows a specific configuration of the video processing module 30. An IP conversion/NR module 31, a scaler 33, a image quality enhancement module 34, a super-resolution module 32, and a rate doubling module 36 are modules which perform the same pieces of processing as the IP conversion/NR module 131, the scaler 133, the image quality enhancement module 134, the super-resolution module 132, and the rate doubling module 136 shown in FIG. 2A.

As shown in FIG. 5, the TV receiver 1 according to the embodiment is different from the TV receiver 101 in that it has no memory corresponding to the frame memory 114B and the pieces of processing are performed in the video processing module 30 in different order than in the video processing module 130. That is, unlike the TV receiver 101, the TV receiver 1 does not require the frame memory 114B because a video analyzing module 22 can perform analysis processing using a video signal that is stored in the frame memory 14. The image quality enhancement module 34 does not read a video signal directly from a frame memory. As a result, the TV receiver is equipped with the frame memory 14, the IP conversion/NR module 31, the super-resolution module 32, the scaler 33, the image quality enhancement module 34, the rate doubling module 36, the video analyzing module 22, a sync signal generation module 41, a clock circuit 42, a sync correction module 43, and a display sync signal generation module 44. The modules having the same names as the modules of the TV receiver 101 have the same functions as the latter and hence will not be described in detail. Modules corresponding to the video analyzing module 22, the sync signal generation module 41, the clock circuit 42, the sync correction module 43, and the display sync signal generation module 44 are also provided in the TV receiver 101 but were not described above.

The video analyzing module 22 analyzes a video signal that is stored in the frame memory 14 and outputs frame information to be used by the controller 20 to control the video processing module 30. More specifically, for example, the video analyzing module 22 divides the dynamic range of the luminance level into n ranges and acquires luminance histogram data of one frame by counting the numbers of pixels corresponding to luminance levels 1 to n of a one-frame video signal. Furthermore, for example, the video analyzing module 22 detects a frequency profile of the video signal. In the TV receiver 101, the video analyzing module analyzes a video signal stored in the frame memory 114B and outputs resulting data to the image quality enhancement module 134 and the super-resolution module 132.

Figure 6:
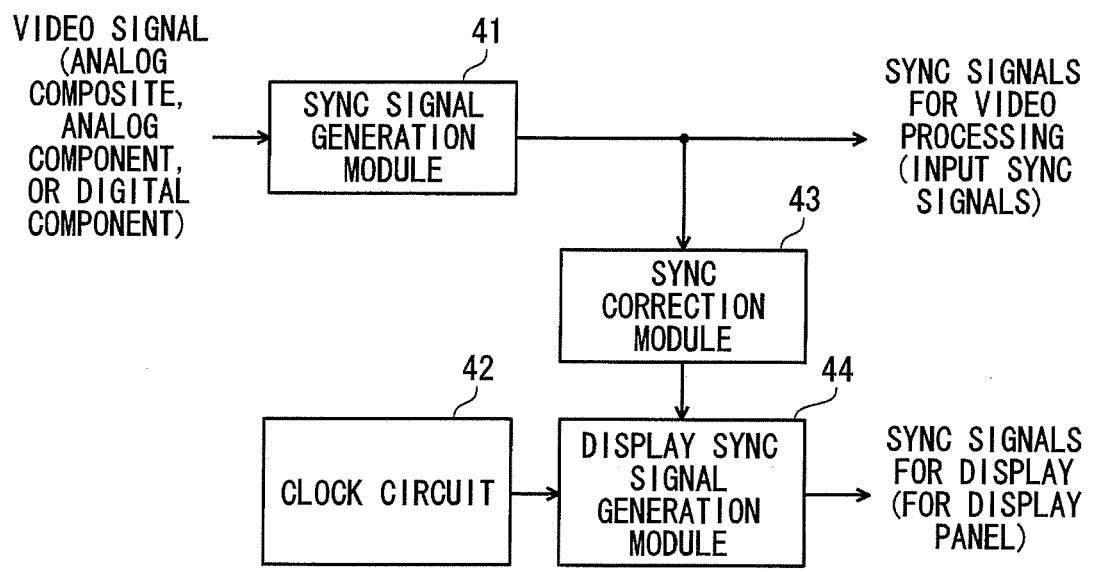
FIG. 6 is an exemplary view showing a relationship of a sync signal of an input video signal and a sync signal of a display video signal.

As shown in FIG. 6, the sync signal generation module 41 generates sync signals by separating them from an input video signal. The clock circuit 42 generates a signal having a certain frequency, and the display sync signal generation module 44 generates, on the basis of the signal generated by the clock circuit 42, sync signals (display sync signals) for a display video signal to be displayed by the display panel 15.

The sync correction module 43 synchronizes the input sync signals generated by the sync signal generation module 41 with the display sync signals generated by the display sync signal generation module 44. Where a flat panel display (hereinafter referred to as FPD) is employed as the display panel 15, horizontal and vertical sync signals (hereinafter referred to as sync signals for display) that are used for display in the FPD are generated asynchronously with the horizontal and vertical sync signals (input sync signals) of the input video signal. The periods of the sync signals for display of the FPD have allowable ranges. If the periods of the input sync signals are within the allowable ranges (hereinafter referred to as sync compensation periods), the FPD can always perform display on the basis of the input video signal.

However, where the sync signals for display are not synchronized with the input sync signals, a display memory may overflow or underflow because of frequency differences between the sync signals for display and the input sync signals. Therefore, the sync correction module 43 synchronizes the display sync signals with the input sync signals. The sync correction module 43 generates display sync signals that are synchronized with certain input sync signals in certain sync compensation periods and outputs the generated display sync signals to the display panel 15.

In the TV receiver 1 according to the embodiment, in the short-delay-processing-on mode, as in the short-delay-processing-off mode, the video processing module 30 performs all the pieces of signal processing shown in FIG. 5. However, in the short-delay-processing-off mode, the controller 20 controls the video processing module 30 to start signal processing after completion of storage of a one-frame video signal in the frame memory 14. In contrast, in the short-delay-processing-on mode, the controller 20 controls the video processing module 30 to start signal processing before completion of storage of a one-frame video signal in the frame memory 14, that is, when a first time T1 (first standby time) has elapsed from a start of the storage. It takes the time (about 16.7 ms) corresponding to one frame to complete storage of a one-frame video signal in the frame memory 14. In the short-delay-processing-on mode, since the video processing module 30 starts signal processing after a lapse of the first time T1 which is shorter than the 1-frame time, the delay time can be shortened by about the 1-frame time. For example, the first time T1 may be 3.65 to 8.65 ms (about a 0.2 to 0.5-frame time).

Furthermore, in the embodiment, in the short-delay-processing-on mode, the controller 20 controls the video processing module 30 so that the rate doubling module 36 starts signal processing before completion of storage of a one-frame video signal in the frame memory 14 and before completion of pieces of signal processing of the modules 31-34 other than the rate doubling module 36, that is, when a second time T2 (second standby time) has elapsed from a start of the pieces of processing of the modules 31-34. That is, in the short-delay-processing-on mode, the modules 31-34 start pieces of signal processing after a lapse of the first time T1 which is shorter than the 1-frame time and the rate doubling module 36 starts signal processing after a lapse of the second time T2 from the start of the pieces of processing of the modules 31-34. Therefore, the delay time can be shortened by about 1.5-frame time. For example, the second time T2 may be 8.35 ms (about 0.5-frame time).

Figure 7:
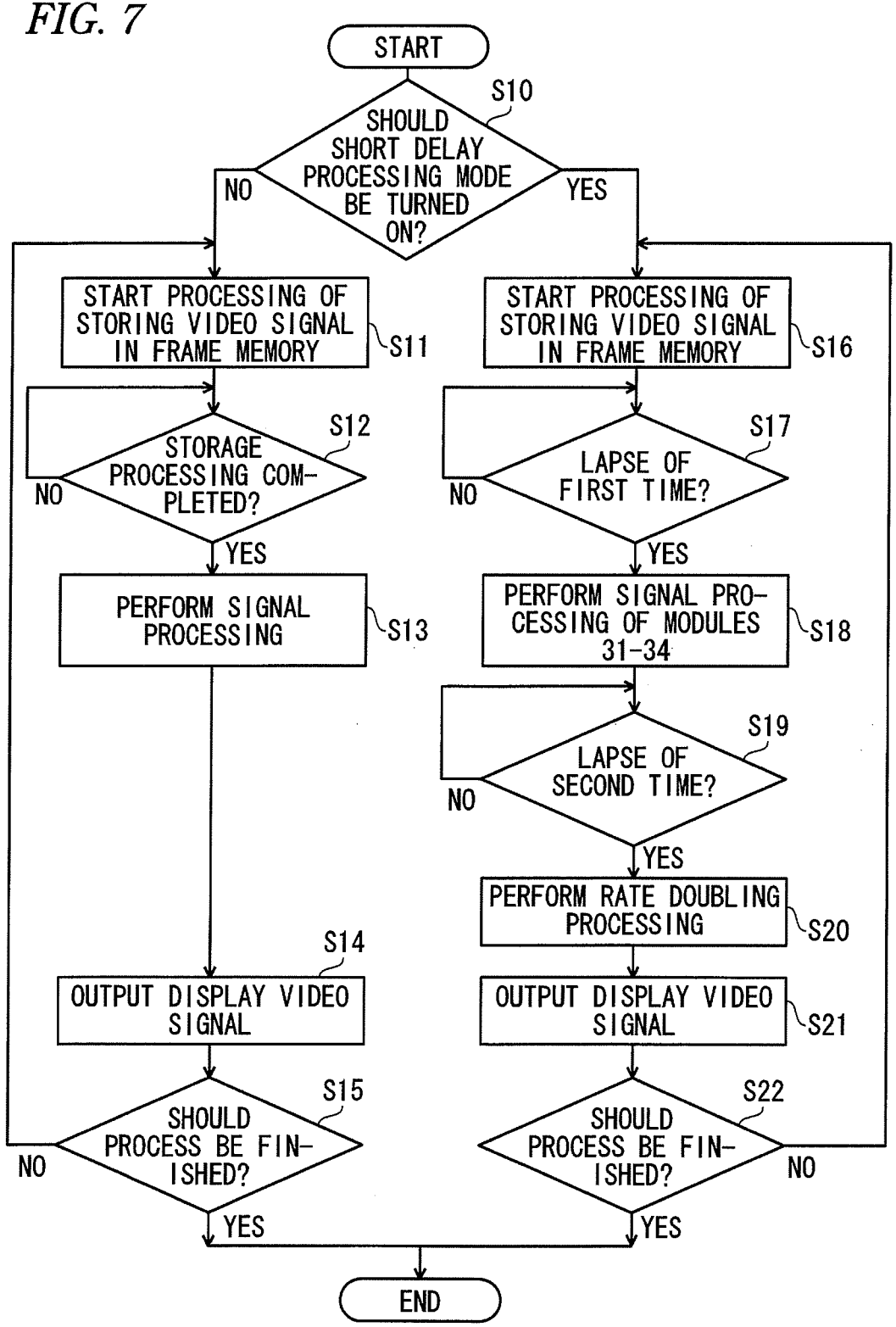
FIG. 7 is an exemplary flowchart showing the video signal processing of the TV receiver according to the embodiment.

A process which is executed by the video processing module 30 of the TV receiver 1 according to the embodiment will be described with reference to a flowchart of FIG. 7.
<Step S10 (Processing Mode Selection)>

Figure 8:
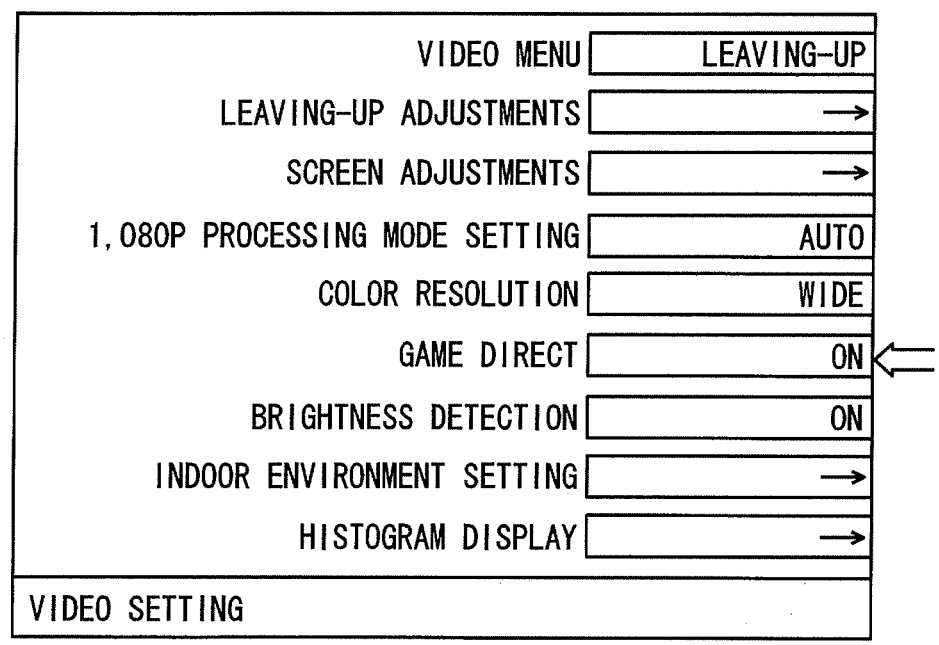
FIG. 8 is an exemplary view showing a display screen for selection processing mode in the TV receiver according to the embodiment.

A signal processing mode is selected, that is, it is determined wither to turn on or off the short delay processing mode in which delay time of a display video signal from an input video signal is short. For example, the controller 20 displays a menu picture as shown in FIG. 8 on the display panel 15. If the user switches the setting of an item "game direct" from "off" to "on" by operating a remote controller or the like, the controller 20 switches a video mode to "game mode." When switching the video mode to "game mode," the controller 20 selects the short-delay-processing-on mode. Conversely, if the user switches the setting of the item "game direct" from "on" to "off," the controller selects the short-delay-processing-off mode. Alternatively, where the external input terminal module 12 has an external input terminal that is dedicated to the game machine 3, the controller 20 automatically switches the video mode to "game mode" and turns on the short-delay-processing-on mode when a signal is input from the game machine 3.

(Short-Delay-Processing-Off Mode)
<Step S11 (Start of Storage Processing)>

If the short-delay-processing-off mode is selected (S10: no), processing of storing a one-frame video signal in the frame memory 14 is started.
<Step S12 (Completion of Storage Processing?)>

The controller 20 controls the video processing module 30 not to start signal processing until the processing of storing a one-frame video signal in the frame memory 14 is completed (S12: yes).
<Step S13 (Signal Processing)>

Upon completion of the processing of storing a one-frame video signal (S12: yes), the controller 20 controls the video processing module 30 to start signal processing. In response, the video processing module 30 starts signal processing of generating a display video signal to be displayed on the display panel 15 on the basis of a received video signal. More specifically, as shown in FIG. 5, the video processing module 30 performs IP conversion/NR processing, super-resolution processing, scaling processing, image quality enhancement processing, sync correction processing, and rate doubling processing in order.

If it is found by an analysis of the video analyzing module 22 that the video signal of the frame concerned is not suitable for display on the display panel 15 such as an extremely degraded video signal, the controller 20 may prohibit output of a display video signal of the frame concerned to the display panel 15.
<Steps S14 (Output of Display Video Signal)>

The video processing module 30 performs signal processing on the video signal and outputs a display video signal to the display panel 15. Video that has been subjected to the signal processing is displayed on the display panel 15. Steps S11-S14 are executed repeatedly until it is judged that the process should be finished (S15: yes).

(Short-Delay-Processing-on Mode)

Next, a process which is executed in the short-delay-processing-on mode will be described with reference to FIGS. 9A-9C and FIGS. 10A-10D. FIGS. 9A-9C illustrate a passing phenomenon, and FIGS. 10A-10D are timing charts of signal processing that is performed in the embodiment.
<Step S16 (Start of Storage Processing)>

If the short-delay-processing-on mode is selected (S10: yes), processing of storing a one-frame video signal in the frame memory 14 is started as in step S11.
<Step S17 (Lapse of First Time?)>

The controller 20 measures the time from the start of the processing of storing a video signal in the frame memory 14 using a timer (not shown) or the like, and controls the video processing module 30 not to start signal processing until a lapse of the first time (delay time) T1 (S17: yes). In other words, the control module 20 does not start processing of reading the video signal stored in the frame memory 14 until the first time T1 elapses from the start of the processing of storing a video signal in the frame memory 14.

This is to prevent what is called a passing phenomenon that write processing and read processing cross each other.

The passing phenomenon will be described below using an example operation of pasting a write image of 10 lines L1-L10 (see FIG. 9A) on a central portion of a displayed image (see FIG. 9B). As shown in the top part of FIG. 9C, pieces of processing of writing (storing) the 10 lines L1-L10 to (in) a memory are performed in time-series order. However, as shown in the bottom part of FIG. 9C, because of the presence of a top region and a bottom region in the displayed image, reading of data of lines that have just been written cannot be started at the same time as a start of write processing. If such reading is done, one-frame-preceding data may be read out. This is a passing phenomenon. Likewise, if reading of a video signal stored in the frame memory 14 is started at the same time as or only a very small time after a start of storage processing, the video signal cannot be read out reliably because of a passing phenomenon.

In view of the above, in the embodiment, the first time T1 is set for which the modules 31-34 should wait before starting pieces of signal processing. FIGS. 10A-10D show pieces of signal processing that are performed in pasting the write image that is divided into the 10 lines L1-L10 shown in FIG. 9A on the central portion of the displayed image shown in FIG. 9B.

As shown in FIG. 10A, pieces of processing of writing (storing) the 10 lines L1-L10 to (in) the frame memory 14 are performed in time-series order according to a write clock WRITE. However, because of a passing phenomenon (described above), reading of data of lines that have just been written cannot be started at the same time as or only a very small time after a start of write processing.

Therefore, the controller 20 controls the video processing module 30 so that signal processing on the video signal stored in the frame memory 14 is not started before a lapse of the first time T1 (S17: yes). The first time T1 is determined as appropriate according to the resolution of a video signal, a display method of a display video signal, etc.

<Step S18 (Start of Pieces of Signal Processing of Modules 31-34)>

When the first time T1 has elapsed (S17: yes), the controller 20 controls the video processing module 30 so that the modules 31-34 start pieces of signal processing before completion of the processing of storing a one-frame video signal in the frame memory 14. The video processing module 30 thus starts reading from the frame memory 14 according to a read clock READ. The modules 31-34 performs pieces of signal processing of generating a display video signal to be displayed on the display panel 15 on the basis of a received video signal in the same manners as in the short-delay-processing-off mode. More specifically, as shown in FIG. 5, IP conversion/NR processing, super-resolution processing, scaling processing, image quality enhancement processing, sync correction processing, and rate doubling processing are performed in order.

<Step S19 (Lapse of Second Time?)>

The controller 20 measures the time from the start of the pieces of processing of the modules 31-34 using a timer (not shown) or the like, and controls the video processing module 30 so that the rate doubling module 36 does not start signal processing until a lapse of the second time (delay time) T2 (S19: yes). In other words, the control module 20 prohibits the rate doubling module 36 from reading a signal processing result of the modules 31-34 until the second time T2 elapses from the start of the pieces of processing of the modules 31-34. This is to prevent the processing of the rate doubling module 36 from passing the pieces of processing of the modules 31-34. The second time T2 is determined as appropriate according to the resolution of a video signal, a display method of a display video signal, write and read processing of a FIFO memory (not shown) that is used by the rate doubling module 36 to perform rate doubling processing, etc.

<Step S20 (Start of Signal Processing of Module 36)>

When the second time T2 has elapsed (S19: yes), the controller 20 controls the video processing module 30 so that the rate doubling module 36 start rate doubling processing before completion of the pieces of processing of the modules 31-34. The rate doubling module 36 thus starts rate doubling processing. The rate doubling module 36 generates a rate-doubled video signal by writing a video signal as produced by the pieces of signal processing of the modules 31-34 to the FIFO memory (not shown) and reading the video signal from the FIFO memory at a double speed.

<Step S21 (Output of Display Video Signal)>

FIG. 10C shows a video signal that is obtained when the rate doubling processing of the rate doubling module 136 of the TV receiver 101 has been performed after the pieces of processing of the module 31-34 shown in FIG. 10B. The rate doubling module 136 sequentially stores a video signal as produced by the pieces of signal processing of the modules 31-34 in to FIFO memory (not shown) for rate doubling processing by controlling the writing and reading of the FIFO memory. When a one-frame video signal has been stored in the FIFO memory, the rate doubling module 136 reads the video signal from the FIFO memory at a double speed and thereby outputs a rate-doubled video signal.

That is, as shown in FIG. 10C, the rate doubling module 136 is given a video signal as produced by the pieces of signal processing of the modules 31-34 in the frame period that follows the frame period in which the pieces of signal processing of the modules 31-34 are completed, that is, after a lapse of a 1-frame time from the reading from the frame memory 14. The rate doubling module 136 performs rate doubling processing on the received video signal and outputs a processed video signal.

In contrast, in the embodiment, as shown in FIG. 10D, when the second time T2 has elapsed from the start of the pieces of processing of the modules 31-34, the rate doubling module 36 starts reading the video signal as produced by the pieces of signal processing of the modules 31-34 from the FIFO memory and perform the rate doubling processing to output a rate-doubled video signal. FIG. 10D shows that the second time T2 is set at a 0.5-frame time.

The video processing module 30 outputs the output of the rate doubling module 36 to the display panel 15 as a display video signal. As a result, video that has been subjected to the pieces of signal processing is displayed on the display panel 15. Steps S16-S21 are executed repeatedly until it is judged that the process should be finished (S22: yes).

As shown in FIG. 11, in the TV receiver 1 according to the embodiment, in the short-delay-processing-off mode the delay time is equal to 33.3 ms which corresponds to two frames. In the short-delay-processing-on mode, the delay time is equal to about 12 to 17 ms (about 0.7 to 1 frame) which is the sum of a delay time 3.65 to 8.65 ms (0.2 to 0.5 frame) of the modules 31-34 and a delay time 8.35 ms (0.5 frame) of the rate doubling module 36. Furthermore, as shown in FIG. 11, even where the input video signal is of 720p or 480p that is smaller than 1,080p of the display panel 15, since scaling processing is performed, the delay time is equal to 12 to 17 ms which is the same as in the case where the input video signal is of 1,080p. FIG. 11 shows a case that the delay time is 12 ms.

That is, in the TV receiver 1, in the short-delay-processing-on mode, even in the case where the rate doubling processing is performed, the delay time is equal to about 12 ms, for example, which is the sum of the first time T1 and the second time T2 which are necessary to prevent a passing phenomenon and which is much shorter than the 1-frame time. It is apparent that the delay time is made even shorter if the rate doubling processing is not performed.

As described above, the TV receiver 1 according to the embodiment is equipped with the controller 20 which controls the video processing module 30 to perform the IP conversion/NR processing, the scaling processing for making a video signal suitable for the specifications of the display panel 15, the resolution enhancement processing for increasing the resolution of a video signal (super-resolution processing), and the rate doubling processing.

That is, in the TV receiver 1 according to the embodiment, at least the IP conversion/NR processing, the scaling processing, the super-resolution processing, and the rate doubling processing can be performed even in the short-delay-processing-on mode. For example, the use of a system LSI having higher capabilities allows more, complicated pieces of processing to be performed.

In the TV receiver 1, even in the short-delay-processing-on mode, a high-image-quality display video signal can be produced because the IP conversion/NR processing, the scaling processing, the super-resolution processing, and the rate doubling processing are performed. Furthermore, the delay time to generation of a rate-doubled video signal is sufficiently short.

As described above, the TV receiver 1 according to the embodiment is a video display apparatus in which the delay time to display of a game content or the like is very short and hence displayed video and output sound do not cause the user to feel uncomfortable when the user makes operations through the game operation module 4. The video processing method of the TV receiver 1 can display video of a game content or the like that does not cause the user to feel uncomfortable.

While certain embodiments have been described, these embodiments have been presented by way of example only, and are not intended to limit the scope of the invention. Indeed, the novel apparatus and method described herein may be embodied in a variety of other forms; furthermore, various omissions, substitutions and changes in the form of the apparatus and method, described herein may be made without departing from the sprit of the invention. The accompanying claims and their equivalents are intended to cover such forms or modifications as would fall within the scope and sprit of the invention.

What is claimed is:

1. A video display apparatus comprising:
    a video processing module configured to perform at least image quality enhancement processing and rate doubling processing on an input video signal to generate a display video signal, and to output the display video signal to a display module;
    a controller configured to receive a command for shortened-delay processing in which a delay time of the display video signal from the video signal is shortened; and
    a frame memory configured to store an at least one frame of the video signal,
    wherein the video processing module is configured to perform signal processing on the video signal stored in the frame memory and to output the display video signal, and
    wherein when receiving the command for the shortened-delay processing, the controller is configured to control the video processing module
        to start at least the image quality enhancement processing after a lapse of a first time from a start of storage of the at least one frame of the video signal in the frame memory before completion of the storage, and
        to start the rate doubling processing after a lapse of a second time from the start of at least the image quality enhancement processing before completion of the image quality enhancement processing.

2. The apparatus of claim 1, wherein when receiving the command for the shortened-delay processing, the controller is configured to control the video processing module to perform at least one of IP conversion processing and noise reduction processing in addition to the image quality enhancement processing.

3. The apparatus of claim 1,
    wherein the video processing module comprises a resolution enhancement module configured to increase resolution of the video signal, and
    wherein when receiving the command for the shortened-delay processing, the controller is configured to control the video processing module to perform processing of the resolution enhancement module in addition to the image quality enhancement processing.

4. The apparatus of claim 1, further comprising:
    a frame analyzing block configured to analyze the one frame of the input video signal stored in the frame memory to generate frame information,
    wherein the controller is configured to use the frame information to control the video processing module.

5. The apparatus of claim 2,
    wherein the video processing module comprises a resolution enhancement module configured to increase resolution of the video signal, and
    wherein when receiving the command for the shortened-delay processing, the controller is configured to control the video processing module to perform processing of the resolution enhancement module in addition to the image quality enhancement processing.

6. The apparatus of claim 2, further comprising:
    a frame analyzing block configured to analyze the one frame of the input video signal stored in the frame memory to generate frame information,
    wherein the controller is configured to use the frame information to control the video processing module.

7. The apparatus of claim 1, wherein when not receiving the command for the shortened-delay processing, the controller is configured to control the video processing module to start the signal processing after the completion of the storage.

8. The apparatus of claim 1, wherein when receiving the command for the shortened-delay processing, the controller is configured to control the video processing module so that the delay time is in a range of 12 milliseconds (ms) to 17 ms.

9. A video processing method comprising:
    performing at least image quality enhancement processing and rate doubling processing on an input video signal by a video processing module to generate a display video signal to be displayed on a display module;
    storing an at least one frame of the video signal in a frame memory;
    controlling the video processing module so that a delay time of the display video signal from the video signal becomes approximately 12 to 17 milliseconds (ms) at a minimum when a short delay processing mode is on; and
    when the storing of the at least one frame of the video signal in the frame memory is started and a command for the shortened-delay processing is received in which a delay time of the display video signal from the video signal is shortened, controlling the video processing module
        to start at least the image quality enhancement processing after a lapse of a first time from the start of the storing of the at least one frame of the video signal in the frame memory before completion of the storing, and
        to start the rate doubling processing after a lapse of a second time from the start of at least the image quality enhancement processing before completion of at least the image quality enhancement processing.

10. The method of claim 9, further comprising:
when the command for the shortened-delay processing is received, controlling the video processing module to further perform at least one of IP conversion processing and noise reduction processing.

* * * * *